COLOR TELEVISION PICKUP SYSTEM

Filed March 17, 1948 3 Sheets-Sheet 1

Inventor
FRANCIS J. DARKE, JR.
BY [signature]
Attorney

Inventor
FRANCIS J. DARKE, JR
BY [signature]
Attorney

Oct. 28, 1952 F. J. DARKE, JR 2,615,974

COLOR TELEVISION PICKUP SYSTEM

Filed March 17, 1948 3 Sheets-Sheet 3

Inventor
FRANCIS J. DARKE, JR.

By

Attorney

Patented Oct. 28, 1952

2,615,974

UNITED STATES PATENT OFFICE 2,615,974

COLOR TELEVISION PICKUP SYSTEM

Francis J. Darke, Jr., Princeton, N. J., assignor to Radio Corporation of America, a corporation of Delaware Application March 17, 1948, Serial No. 15,387

7 Claims. (Cl. 178—5.2)

This invention relates to television image pickup, and more particularly to the development of the simultaneous type color television signals.

The invention will be illustrated, for purposes of example, as a tricolor television system, but is equally applicable to bicolor, quadricolor, tricolor plus neutral-color key plate, or any other similar form of multicolor additive television.

As is well known in the television art, the transmission of visual information over electrical circuits, such as radio circuits and the like, can be accomplished by analyzing the image into not only its image elements, but also selected color components of the image, and deriving therefrom by an orderly sequence of scanning a signal train of impulses representative of elemental detail for each of the selected color components. Images in substantially their natural color can then be reproduced at a remote location from the electrical signal trains by reconstruction by the same orderly sequence of scanning.

For the purpose of reference herein, the three selected color components will be mentioned as red, green and blue, although any suitable three colors may be selected, with the condition being that all are to add to produce white, and that no two shall add to produce a third color. The selection of the component colors is preferred where the greatest portion of the I. C. I. color triangle is usable.

It will be remembered that in an additive process of color reproduction, it is essential that the several component color images must be in substantially perfect registery to produce desirable results.

When three separate physical devices are employed for the reproduction of color images, one for each of the selected component colors, there may be involved difficulties in making optical, electrical and mechanical alignment, which may preclude the convenient adjustment for proper registration of the several selected component color images.

There has been proposed the sequential method for the reproduction of color images by the additive method. Most of the systems proposed for the sequential arrangement have involved mechanical devices which have proved to be generally unsatisfactory.

Various electronic arrangements have been proposed for the development by the sequential arrangement of color images. One such arrangement is proposed by Alfred N. Goldsmith in U. S. Patent 2,343,971, dated March 14, 1944, and entitled "Television Studio Lighting." Goldsmith proposes that ". . . the illumination of the set, performed by flashing lamps, gives a selective and efficient radiation of an appropriately colored light, which with minimum filtering corresponds to the desired color component illumination. The illumination or flashing of lamps takes place during the blanking interval of the field scanning of the camera mosaic and the cyclic repetition of the red, green and blue flashes from the lamps within the return line period of the field scanning may be made in any desired order within each cycle of operation. Thus, it will be observed that during the return line time a high intensity of red light will be projected upon the screen. The duration of the flash, being short, charges up the mosaic with an electrically stored image during the return line time of the field scanning. The mosaic is subsequently scanned to produce a train of signals which correspond to the red image. After the end of the scanning of the mosaic, a green flash of high intensity takes place during the return line time and the mosaic is then scanned to produce a train of signals corresponding to the green image. Following this, a high intensity blue flash of illumination is provided again during the return line time and the subsequent scanning provides a wave train of signals corresponding to the blue image. The cycle is then repeated. Since the scene is illuminated for each field by only one primary component of color, it will be understood there is no necessity for providing a filter disk in front of the camera, since the light source itself provides suitable color filtered illumination. . . ."

In the copending U. S. application of Otto H. Schade, Serial No. 788,135, filed November 26, 1947, now Patent No. 2,579,971, issued December 25, 1951, the necessity for illuminating the scene in accordance with the Goldsmith proposal outlined above by lamps corresponding to various component colors is eliminated. According to the Schade proposal, the light responsive electrode of the camera tube is provided with a plurality of extremely small color filter sections of several selected component colors.

According to the Schade proposel, the optical image projected and focused on the pickup tube target then produces three separate electrostatic charges corresponding to the amounts of red, green and blue light. When the electron beam scans the target, the red, green and blue color filter sections produce successive signals in the usual manner which, if not properly separated, are so close together in the tube output circuit as to produce the usual black and white or monochrome effect.

In order to obtain color separation which is necessary for the reproduction of color images at a remote location, Schade proposes that in one complete field, the signal from one group of color areas are biased by projecting different component color lights sequentially into the light responsive electrode during successive field retrace periods. The successive flashes of red, green and blue light optically bias a single color component to produce signals having an amplitude range above the amplitude range of the signals representative of the component colors not biased.

The mechanical arrangements proposed for the sequential method and the arrangements of Alfred N. Goldsmith and Otto H. Schade outlined above are generally affected with color action fringes and the like to reduce to some extent the entertainment value of the televesion system.

The popular simultaneous type system which transmits information concerning all three selected component color images simultaneously through separate signal channels is not subjected to such disadvantages.

According to this invention, color separation is obtained by continuously projecting, in addition to the image, different amounts of lights of all except one of the selected color components on a multiple section color filter at the image pickup tube. Different color components of the image are in this way differently biased so that they have a different D. C. component sufficient to cause them to occupy different amplitude ranges in the image pickup tube output signal. Amplitude range selective circuits are then employed in the output of the image pickup tube to segregate the different component color representative signals. The simultaneous type signals are then produced by integration of the various signal trains.

In a three-color system, two different lights of the three selected component colors are projected continuously on the target at two different intensity levels to provide optical bias. Three amplitude range selective circuits then separate the selected component color representative signal trains to produce through signal integration a simultaneous type color television signal.

A primary object of this invention is to provide an improved color television system.

Another object of this invention is to provide for the conversion of television images into the simultaneous type color television signals by the employment of the usual black and white camera tube with a modified target.

Another object of the invention is to eliminate registration problems in the color television camera.

Other and incidental objects of the invention will be apparent to those skilled in the art from a reading of the following specification and an inspection of the accompanying drawing in which:

Figures 1*a* and 1*b* illustrate by block diagram two forms of this invention;

Figure 1A:
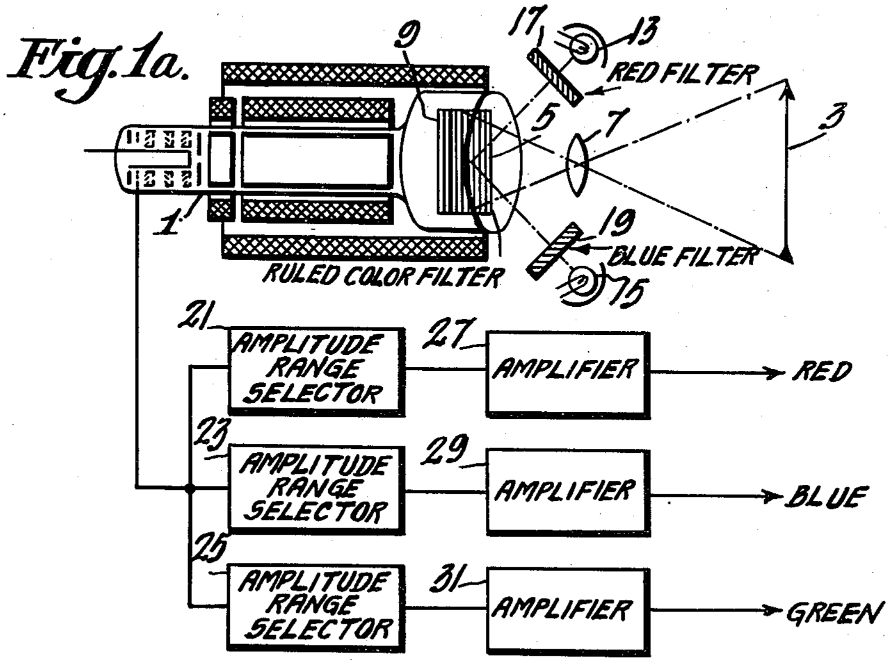
Figure 1B:
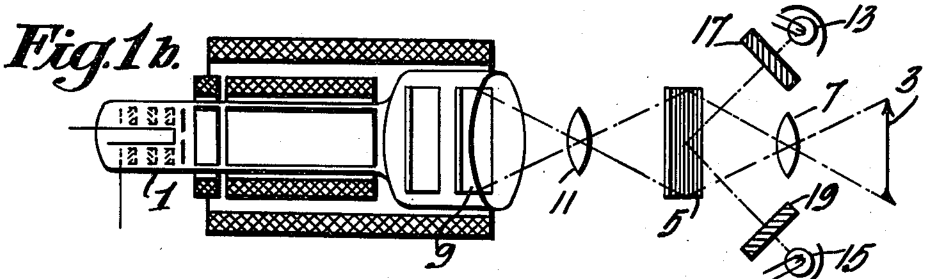

Turning now in more detail to Figures 1*a* and 1*b*, there is shown a camera tube 1 which may take the form of an image orthicon, an orthicon, the iconoscope, or any other camera tube capable of reproducing fine detail.

Figure 2:
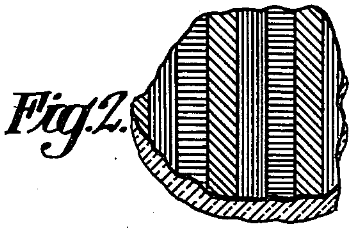
Figures 2 and 3 illustrate in greatly enlarged section color filters suitable for employment in this invention.
Figure 3:
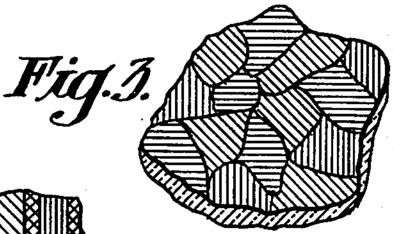

Light from the object 3 is focused on the ruled or other type multiple color filter 5 through lens 7 to form an image on the color filter 5. Details concerning color filter 5 are illustrated in Figures 2 and 3 and will be discussed in more detail below.

In Figure 1*b*, the image formed on the color filter 5 is projected to the target 9 of the camera tube 1 through lens 11. In the form of the invention shown in Figure 1*a*, the color filter 5 and target 9 are positioned together so no lens 11 is required.

An image section is included in the camera tube 1 of Figure 1*b*.

Auxiliary light sources are provided in the form of lamp 13 and lamp 15, which are arranged to project light through color filters 17 and 19, respectively, on to the ruled color filter 5. In the form of the invention shown in Figure 1*b*, color filter 5 contains, for example, a light diffusing surface in order that colored lights from filters 17 and 19 may be added to the color projected from object 3 by lens 7 on the ruled color filter 5.

Lamps 13 and 15 are arranged, however, either mechanically or electrically to project different amounts of colored lights on the filter 5. This may be accomplished by the employment of suitable light masks.

The output of the camera tube 1 is connected to the input of three separate amplitude range selectors 21, 23 and 25.

The operation of the device shown in Figures 1*a* and 1*b* will best be understood by a reference to Figures 1*a*, 1*b*, 2, 3 and 4, in combination.

The theory of operation of camera tubes is quite well known to the art, and will not be explained in detail here. It is sufficient to say, for the purpose of explanation of the operation of this invention, that the scanning beam produces a signal from the electrical charge of the image representation produced on the target electrode.

During the time interval that the scanning beam of the transmitter tube 1 is scanning the green sections of the filter 5, information concerning only the green color component of object 3 is found in the signal output of the transmitter tube 1. Likewise, when the scanning beam is scanning the red sections of the color filter 5, information concerning only the red color component of the object is produced in the output circuit of the tube 1. Then, when the beam progresses in its scanning motion to the blue sections of the filter 5, information concerning only the blue color component of the object 3 is converted into signal energy.

No intelligence concerning color is available in the signal train as developed in this manner.

If, however, light 13 is caused to project a red light on the filter 5, the effect of the red light on the filter 5 will be to add a direct current component to the red representative signal. If the amount of red light projected on the filter 5 is adjusted such that it will optically bias the target 9 to a point above the peak amplitude of the green light from the object, the green and red representative signals in the output of tube 1 may be separated by amplitude range selector 25 for the green representative signals and amplitude range seelctor 21 for the red representative signals. If, in addition to the red light, there is projected a blue light on filter 5 with such an intensity that there is an optical bias placed on the blue sections of the target 9 to cause the signals developed in the blue representative sections to vary through an amplitude above both the green and the red amplitude ranges, the blue representative signals may be selected and isolated in amplitude range selector 23.

It might be suggested that the output signal of amplitude range selectors 21, 23 and 25 are of the elemental sequential type of signals. This is true because of the finite size of the sections, elements or segments of the filters illustrated in detail in Figures 2, 3 and 4. Due to the small size of the sections of the filters, the signals resulting from the scanning thereof can be passed through the amplifiers 27, 29 and 31, which will tend to integrate the signals to form three simultaneous signal trains. The amplifiers 27, 29 and 31 may supply the integration characteristics by either an auxiliary integrator in any of the well-known forms or through certain frequency cut-off characteristics adjusted to adequately cover the necessary detail.

Figure 4:
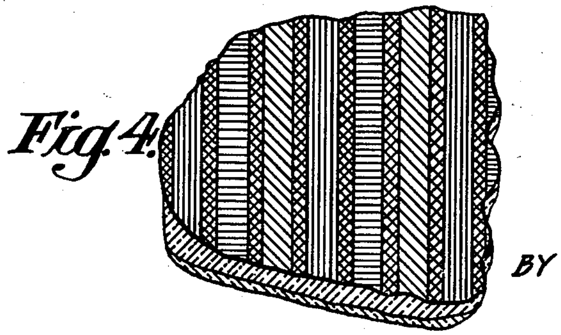
Figure 4 shows also by enlarged section a camera tube target electrode including an associated color filter of still another suitable type.

Turning now to Figure 4, there is shown in greatly enlarged section another form of multiple color filter which employs an opaque section between each of the color sections. The black or opaque sections are preferably chosen to have a width substantially equal to the width of the scanning element. It will be seen that such an arrangement will prevent color dilution from the overlapping of the scanning element to cover two colors at the same time.

Other arrangements for the prevention of color dilution by scanning element overlap of more than one color filter element have been proposed, such as the employment of negative components into each color signal train sufficient to balance out the undesired color signal component.

In the form of the invention shown in Figure 4, the color filter is attached directly to the target, as shown in Figure 1*b* above.

Figure 5:
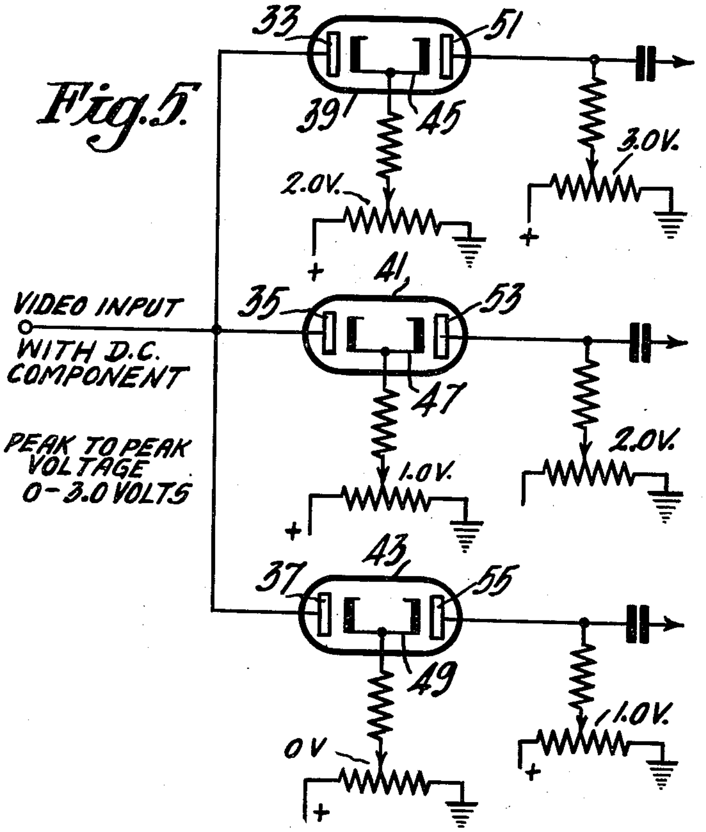
Figure 5 illustrates by circuit diagram one suitable signal amplitude range selective arrangement.

Turning now to Figure 5, there is illustrated by circuit diagram one form of signal amplitude range selector suitable for employment in the form of the invention shown in Figures 1*a* and 1*b* as amplitude range selectors 21, 23 and 25.

The video signal received directly from the camera tube or through an amplifier which does not lose the direct current component received from the camera tube is applied to the anodes 33, 35 and 37 of double diodes 39, 41 and 43.

A biasing potential is applied to cathodes 45, 47 and 49 through appropriate potentiometer and resistance arrangements, as indicated. Likewise, a bias potential is applied to anodes 51, 53 and 55.

The values of voltages applied to the cathodes and anodes of the dual diodes are indicated by way of example only, and it is not intended that the invention be limited thereby.

The operation of the circuit shown in Figure 5 may best be understood when it is remembered that a diode or diode section will pass current in only one direction, and when the potential of its anode is less than its associated cathode, no current will flow therethrough; however, when the potential of the anode exceeds in a positive direction the potential of its associated cathode, a current will flow.

It follows that no current will flow through the input section of diode 39 when the input signal has a voltage less than 2.0 volts. When, however, the amplitude of the input signal exceeds 2.0 volts, current will flow in the input section of diode 39. Current will continue to flow through the diode 39 as long as the input voltage does not exceed 3.0 volts to cause cathode 45 to exceed in a positive direction the bias potential applied to anode 51. Therefore, the output signal from dual diode 39 is only that portion of the video input signal which varies between a 2.0 voltage and 3.0 volts.

Dual diode 41 functions in the same manner, except that the bias potentials are arranged such that dual diode 41 passes only that portion of the video input signal which is between the levels of 1.0 voltage and 2.0 volts.

In dual diode 43, the bias potentials are arranged so that tube 43 passes only that portion of the video input signal which is between 0 volt and 1.0 volt.

It will therefore be seen that if the optical bias applied to the transmitter tubes illustrated in Figures 1*a* and 1*b* are such as to cause one selected component color to have a range of signals only between predetermined amounts, and another selected component color to have signals only between another pair of amounts, color separation may be made by the circuit arrangement illustrated in Figure 5.

Figure 6:
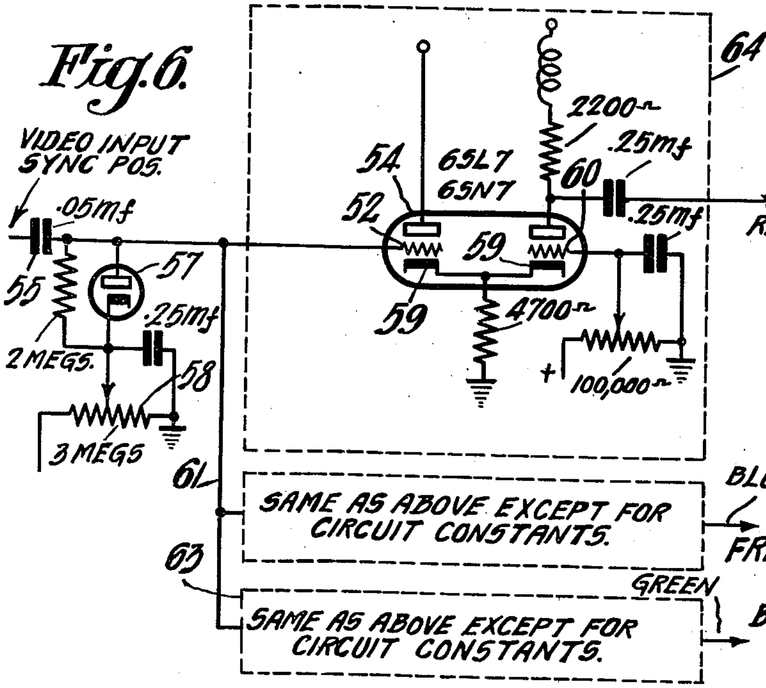
Figure 6 shows by circuit diagram another form of signal amplitude range selective arrangement which performs also as a signal amplifier.

Turning now in more detail to Figure 6, there is shown another circuit arrangement for separating the color component signals from the signal train received from the transmitter tube 1 of Figures 1*a* and 1*b*.

The video input signal from the camera tube is applied to control electrode 52 of tube 54. It will be seen that the input signal is applied through a condenser 55, which will lose the direct current component required for application to the circuit arrangement shown in Figure 5.

In the form of the invention including the circuit arrangement shown in Figure 6, it is possible to include an A. C. amplifier ahead of the amplitude range selector shown by circuit diagram in Figure 6. The direct current component is restored by applying to diode 57 an appropriate bias potential through the associated potentiometer 58.

The dual triode 54 operates to pass signals only between a predetermined amplitude range which may be selected by proper choosing of the circuit constants.

The video input signal is applied to control electrode 52. The cathodes 59 of tube 54 are connected together, while a fixed bias potential is applied to the control electrode 60. The amount of bias applied to control electrode 60 will determine the point of cut-off. The operation of tube 54 may be described as follows. The positive bias applied to control electrode 60 causes the cathodes 59 to rise to such a positive value as to cut off the effect of control electrode 52 until the incoming video signal reaches a sufficiently positive value to cause the first half of the tube including control electrode 52 to draw current. When the first half of the tube 54 draws current, a signal is applied to the second half of tube 54 involving control electrode 60 through cathodes 59. This signal will be reflected in the output circuit of tube 54.

When, however, the amplitude of the incoming video signal applied to control electrode 52 reaches a sufficiently positive value to cause cathodes 59 to exceed in a positive direction the potential applied to control electrode 60, the second section of tube 54 involving control electrode 60 will cease to draw current and therefore prevent the passage of signals into the output circuit of tube 54.

Typical circuit constants are illustrated by way of example, but other values may be chosen for operation of this device.

Blocks 61 and 63 at the bottom of Figure 6 contain circuit arrangements similar to that shown in block 64, with the exceution of circuit constants and bias potentials.

Figure 7:
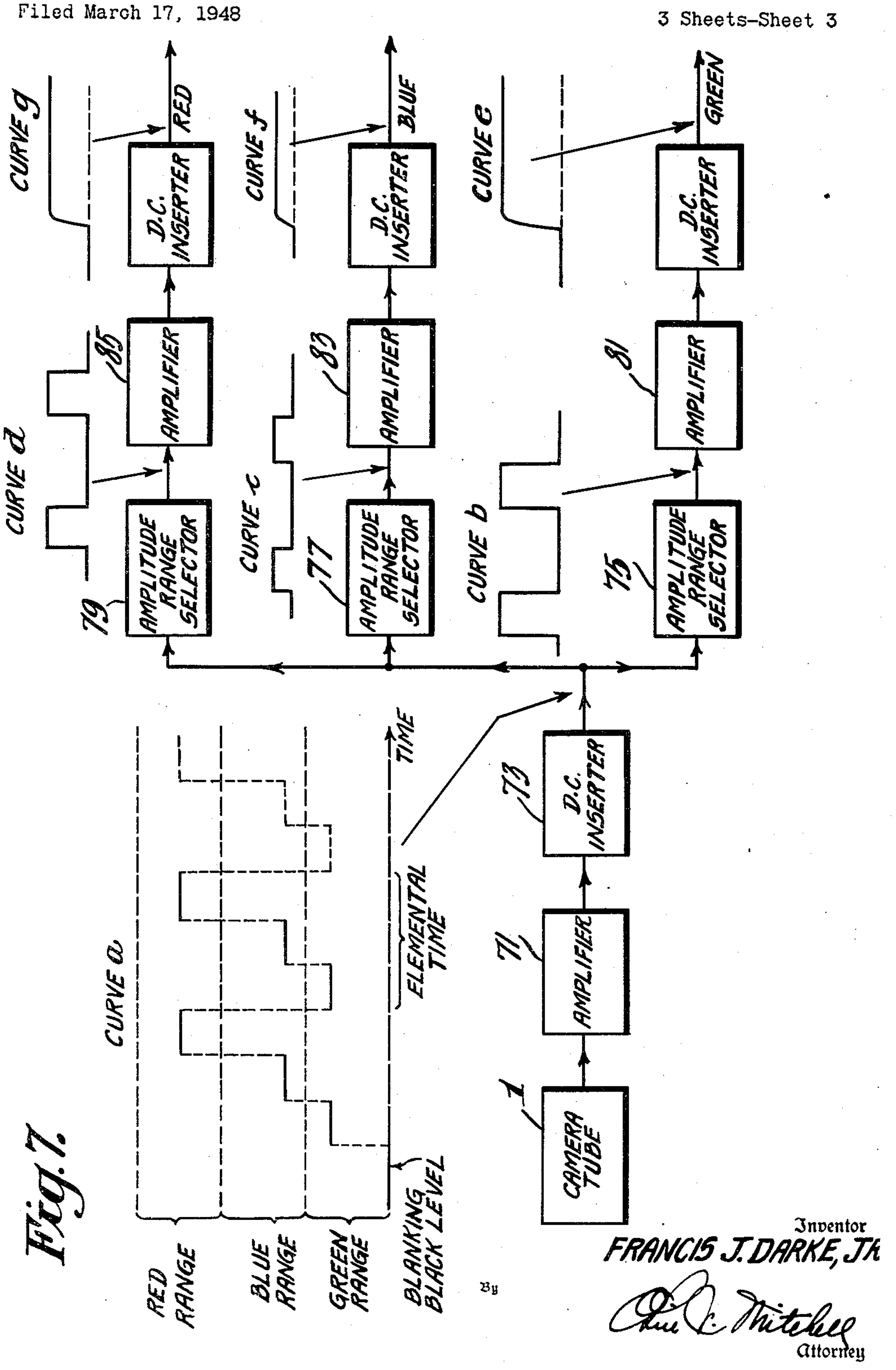
Figure 7 shows by block diagram and by graphic illustrations the operation of this invention.

Turning now in detail to Figure 7, there is illustrated a camera tube 1 followed by an amplifier 71.

In accordance with the well-known procedure that the direct current component of a video signal must be restored before any modification in the video signal is made, a D. C. reinserter 73 is included in the circuit. The operation of direct current reinserters is quite well-known in the art, and an excellent treatise on the subject may be found in an article entitled "The Television D. C. Component" by Karl R. Wendt, published in the "RCA Review" for March 1948.

In accordance with the theories of operation of this invention outlined above, the output circuit of the D. C. inserter 73 will have a signal which appears like that illustrated in curve *a* of Figure 7.

It will be seen from curve *a* that the green representative signal is restricted in amplitude to the lower third section. The blue representative signal is restricted in amplitude to the middle or second range, while the red representative signal is restricted to the top third of the total amplitude range.

The position of the blanking signal is illustrated and is employed as a reference level. It is important for the proper operation of this invention that such reference level be employed. As illustrated, the blanking level occurs at the beginning of each scanning line. It may, however, be employed after each group of color components. This latter modification may be obtained by the employment of the target of the type illustrated in Figure 4, wherein, if desired, the blanking may be inserted between each selected component color.

The output signal of the D. C. inserter 73 is then passed to amplitude range selectors, 75, 77 and 79.

The output signal of the several amplitude range selectors 75, 77 and 79 is illustrated graphically in curve *b*, curve *c* and curve *d*, respectively.

It will be noted that the signal amplitudes illustrated in curves *b*, *c* and *d* correspond to the relative amplitude in their respective amplitude ranges of each of the signals of curve *a*.

The various signals are then amplified in amplifiers 81, 83 and 85. The amplification characteristics of the several amplifiers 81, 83 and 85 are so arranged as to appropriately integrate the signals of the amplitude range selectors to form three simultaneous type color television signals illustrated in curves *e*, *f* and *g* after inclusion of the necessary D. C. component by the several D. C. inserters illustrated.

It will be seen that signals obtained in accordance with the practice of this invention will not suffer from the usual misregistration difficulties present when several camera tubes are employed for obtaining separate component color signals. It will also be seen that the present system employs a minimum equipment arranged to operate at a maximum efficiency.

Having thus described the invention, what is claimed is:

1. A television pickup system comprising in combination means for forming a color image, means for converting said color image into an electrical image representation, means for optically adding at any one time different electrical bias to the electrical image representations of different selected color components, means for scanning said electrical image representation, means for developing from said scanning operation a train of electrical signals, means for dividing said train of electrical signals into separate amplitude ranges, and means for developing independent type television signal trains representative of each selected component color from the divided trains of electrical signals.

2. A television system comprising means for forming an optical image, means for dividing said optical image into groups of sections, each section of a group limited in its representation to one different selected color component of the corresponding image sectional area, means for converting said divided optical image into an electrical image representation of said divided optical image, means for adding different amounts of electrical bias to the electrical image representations of different selected color components by different illumination of sections of said image, scanning said electrical image representation, means for developing from said scanning operation a train of electrical signals, means for dividing said train of electrical signals into separate amplitude ranges defined by said electrical bias, and means for developing independent signal trains representative of each selected component color from the divided trains of electrical signals.

3. A color television image pickup system comprising in combination an image pickup tube having an electron scanning beam, means for dividing an optical image into a plurality of groups of sections, each section of a group limited in its representation to one different selected component color, an optical system to project an image on said sections, a plurality of sources of different selected color component illumination of different amounts simultaneously directed at said sections, a target electrode positioned to receive said scanning beam and arranged to convert light from said sections into an electrical image representation, and means connected to said image pickup tube for selecting signal energy from each of a plurality of predetermined amplitude ranges defined by said color component illumination.

4. A color television image pickup system comprising in combination an image pickup tube having an electron scanning beam, means for dividing an optical image into a plurality of groups of sections, each section of a group limited in its representation to one different selected component color, said sections being so small as to appear indistinguishable to the unaided human eye at normal viewing distance, an optical system to project an image on said sections, a plurality of sources of different selected color component illumination of different amounts arranged to be continuously directed at said sections simultaneously, a target electrode positioned to receive said scanning beam and arranged to convert light from said sections into an electrical image representation of the light on said sections, and means connected to said image pickup tube for dividing signals into a plurality of independent amplitude ranges established by said color component illumination directed at said sections.

5. A color television image pickup system comprising in combination an image pickup tube having an electron scanning beam, means for dividing an optical image into a plurality of repeating, adjacently positioned groups of sections, each section of a group limited in its representation to one different selected component color and arranged to receive a color image, a source of light of some of said selected component colors, said sources of light arranged to simultaneously flood said sections, a target electrode positioned to receive said scanning beam and arranged to convert light from said sections into an electrical image representation of the light on said sections, and means connected to said image pickup tube for dividing signals into a plurality of independent amplitude ranges, said amplitude ranges arranged by said sources of light.

6. A color television image pickup system comprising in combination an image pickup tube having an electron scanning beam, means for dividing an optical image into a plurality of repeating, adjacently positioned and similar groups of sections, an optical system to project an image on said sections, a source of light of a plurality of said selected component colors, said sources of light arranged to flood said sections simultaneously with different amounts of light to optically bias said sections, a target electrode positioned to receive said scanning beam and arranged to convert light from said sections into an electrical image representation of the light on said sections, and means connected to said image pickup tube for selecting signal energy from each of a plurality of predetermined amplitude ranges depending upon said bias.

7. A color television image pickup system comprising in combination an image pickup tube having an electron scanning beam and an output circuit, means for dividing an optical image into a plurality of repeating, adjacently positioned and similar groups of strip-like sections, an optical system to project an image on said sections, a source of bias light of different brilliance of each of said selected component colors, with the exception of one, said sources of light arranged to flood said sections simultaneously, a target electrode positioned to receive said scanning beam and arranged to convert light from said sections into an electrical image representation of the light on said sections, and means connected to said image pickup tube output circuit for dividing signals in accordance with said bias into a plurality of independent amplitude ranges, the number of amplitude ranges corresponding to the number of selected component colors employed in the system.

FRANCIS J. DARKE, Jr.

REFERENCES CITED

The following references are of record in the file of this patent:

UNITED STATES PATENTS

| Number | Name | Date |
|---|---|---|
| 2,253,292 | Goldsmith | Aug. 19, 1941 |
| 2,296,908 | Crosby | Sept. 29, 1942 |
| 2,297,524 | Anderson | Sept. 29, 1942 |
| 2,406,760 | Goldmark | Sept. 3, 1946 |
| 2,413,075 | Schade | Dec. 24, 1946 |